(12) United States Patent
Yocam et al.

(10) Patent No.: US 10,757,097 B2
(45) Date of Patent: Aug. 25, 2020

(54) TEMPORAL IDENTITY VAULTING

(71) Applicant: T-Mobile USA, Inc., Bellevue, WA (US)

(72) Inventors: Eric Wayne Yocam, Sammamish, WA (US); Shawn David Corey, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 204 days.

(21) Appl. No.: 15/687,639

(22) Filed: Aug. 28, 2017

(65) Prior Publication Data

US 2019/0068586 A1 Feb. 28, 2019

(51) Int. Cl.
*H04L 29/06* (2006.01)
*H04W 12/06* (2009.01)
*H04L 9/32* (2006.01)

(52) U.S. Cl.
CPC ........ *H04L 63/0853* (2013.01); *H04L 9/3228* (2013.01); *H04L 9/3231* (2013.01); *H04L 63/0861* (2013.01); *H04L 63/0884* (2013.01); *H04W 12/06* (2013.01)

(58) Field of Classification Search
CPC ............... H04L 63/0853; H04L 9/3228; H04L 63/0884; H04L 63/0861; H04W 12/06
See application file for complete search history.

(56) References Cited

U.S. PATENT DOCUMENTS

| | | | | |
|---|---|---|---|---|
| 6,484,260 | B1 * | 11/2002 | Scott ....................... | G06F 21/32 713/182 |
| 9,639,620 | B1 * | 5/2017 | Ding ........................ | G01N 3/40 |
| 9,741,186 | B1 * | 8/2017 | Lemke ................ | G07C 9/00571 |
| 9,876,788 | B1 * | 1/2018 | Ziraknejad .............. | G06F 21/45 |
| 10,237,256 | B1 * | 3/2019 | Pena ........................ | H04L 63/08 |
| 2014/0002236 | A1 * | 1/2014 | Pineau .................... | G06F 21/32 340/5.6 |
| 2016/0012655 | A1 * | 1/2016 | Hanson .............. | G07C 9/00039 340/5.54 |

(Continued)

FOREIGN PATENT DOCUMENTS

| KR | 20150131597 | 11/2015 |
|---|---|---|
| KR | 101588197 | 2/2016 |

(Continued)

OTHER PUBLICATIONS

The PCT Search Report and Written Opinion dated Nov. 29, 2018, for PCT Application No. PCT/US2018/045601, 13 pages.

*Primary Examiner* — Jeffrey C Pwu
*Assistant Examiner* — William A Corum, Jr.
(74) *Attorney, Agent, or Firm* — Lee & Hayes, P.C.

(57) ABSTRACT

A temporal identity vault used to authenticate an individual is described herein. User identifying input is received on a device, such as a cell phone. The identifying input is, in some examples, encrypted and stored as a temporal identity vault. The temporal identity vault is configured for a use. The use may be a time, location, or the like. A beacon is associated with the temporal identity vault. If the beacon is at a location relative to an object, the authentication process is started. The information stored in the temporal identity vault is authenticated at a central service. Upon authentication, the user is permitted to operate an object. The temporal identity vault may thereafter be deleted.

20 Claims, 8 Drawing Sheets

(56) References Cited

U.S. PATENT DOCUMENTS

| | | |
|---|---|---|
| 2017/0084101 A1 | 3/2017 | Yun |
| 2017/0161978 A1* | 6/2017 | Wishne .............. G07C 9/00309 |
| 2017/0316408 A1* | 11/2017 | Bernesby ........... G06Q 20/3829 |
| 2018/0047227 A1* | 2/2018 | Beavers ............. G07C 9/00087 |
| 2018/0146374 A1* | 5/2018 | Golan ................. H04L 63/083 |
| 2018/0241750 A1* | 8/2018 | Serban ................... H04L 63/10 |
| 2019/0325427 A1* | 10/2019 | Frollini ............. G06Q 20/3278 |

FOREIGN PATENT DOCUMENTS

| | | |
|---|---|---|
| KR | 20160016244 | 2/2016 |
| KR | 20170018128 | 2/2017 |

* cited by examiner

TEMPORAL IDENTITY VAULTING

BACKGROUND

Interacting with systems or devices often require the submission of identifying information to authenticate the user of the system or device. From logging into a computer to entering a building, some information about the user is often required to authenticate the person to determine if the user has a requisite level of permission to access a system or use a device. Security measures to protect personally identifying information are often used to try to thwart nefarious individuals from attempting to illicitly gain access to that personally identifying information and using that information for unauthorized purposes.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
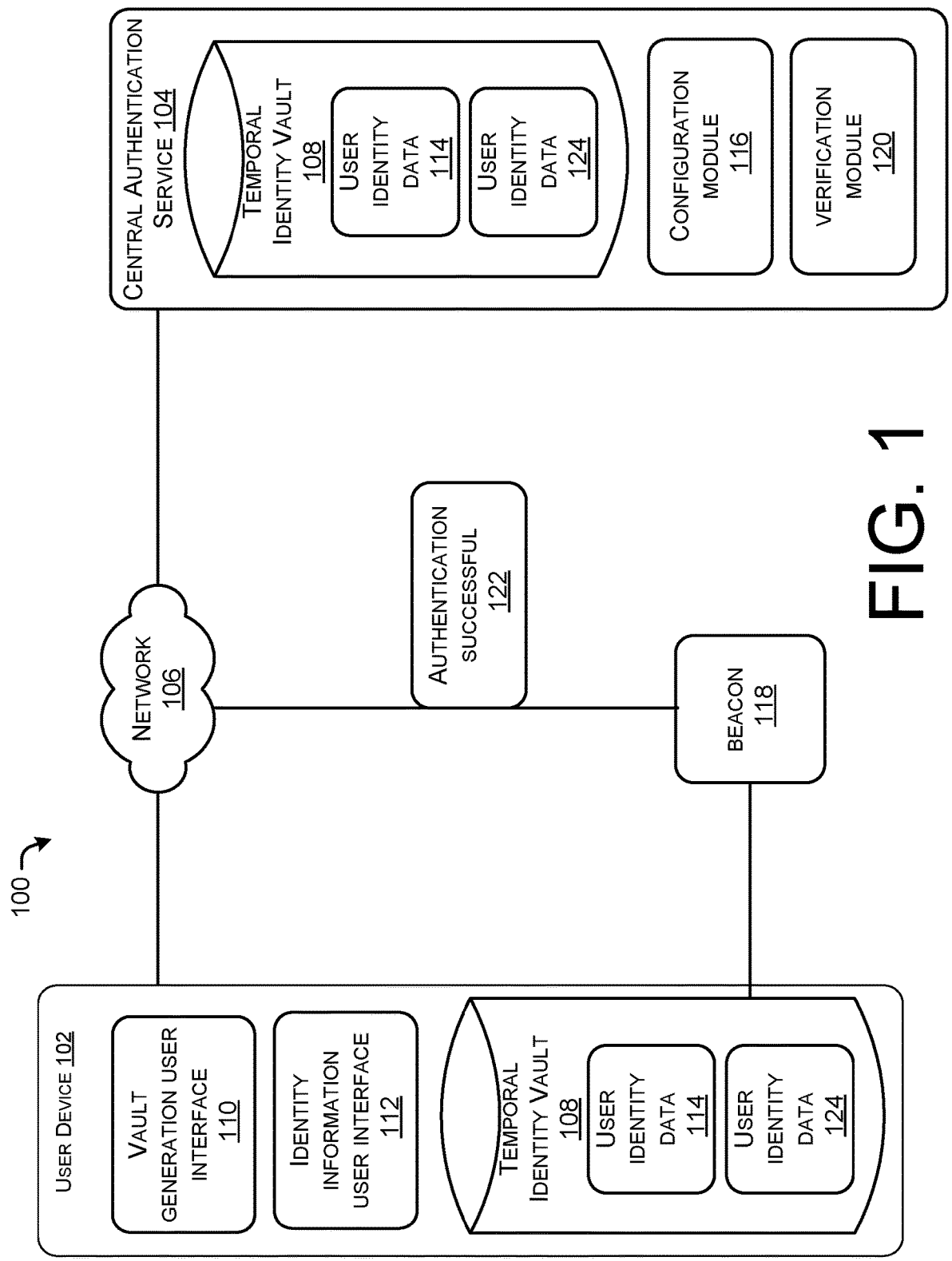
FIG. 1 illustrates an example environment.

Described herein are technologies for temporal identity vaulting. In some examples, a temporal identity vault is used to identify or authenticate an individual. In some examples, a temporal identity vault is created using various forms of identification information used to identity an individual. The forms of information can be obtained using a computer device, such as, but not limited to, a mobile phone, tablet, or portable computer.

In some examples, upon the collection of the identification information, the information is encrypted and stored as a temporal identity vault. The temporal identity vault can be stored in various locations such as, but not limited to, at the computer device, in a central storage location such as a cloud service, or at both the computer device and the central storage location.

The temporal identity vault is associated with a beacon. As used herein, a "beacon" is a device whose position or location at a time is determinable. A beacon is used as a source of information to indicate that a user is at a location. In some examples, a beacon is a portable device such as a key fob or a cellular device. The beacon is used to indicate to an authentication system that a user associated with the beacon is at a location. When at the location, the beacon causes the authentication process to commence.

During the authentication process, the temporal identity vault stored on a device associated with the user is compared to a temporal identity vault stored in a remote service such as a cloud service. If the temporal identity vault stored on the device associated with the user is authentic, indicating that the user identity has been confirmed, the authentication system will transmit an approval communication to the location, allowing the user to perform operations, access the location, and the like.

In some examples, using a temporal storage vault can provide various technical advantages. For example, in some examples, the use of a temporal vault can decrease the amount of information required to authenticate an individual, reducing the use of network resources.

While the technical details are presented herein in the general context of program modules, those skilled in the art will recognize that the configurations can also be implemented in combination with other program modules. Generally, program modules include routines, programs, components, data structures, and other types of structures that perform particular tasks or implement particular abstract data types.

Moreover, those skilled in the art will appreciate that the configurations described herein can be practiced with various computer system configurations, including hand-held devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In the following detailed description, references are made to the accompanying drawings that form a part hereof, and in which are shown by way of illustration specific configurations or examples. Referring now to the drawings, aspects of the various implementations provided herein and an exemplary operating environment will be described.

FIG. 1 illustrates an example operation environment 100. Example user device 102 is in communication with a central authentication service 104 through a network 106. The central authentication service 104 is a computing system or apparatus configured to provide authentication services, as described in more detail below. In some examples, the user device 102 is a cellular telephone, although the presently disclosed subject matter is not limited to the use of a cellular telephone, as other devices capable of performing the functionality described herein may be used and are considered to be within the scope of the presently disclosed subject matter. In some examples, the central authentication service 104 is a cloud-based, enterprise, or any other type of computing system capable of performing the functionality described herein and is considered to be within the scope of the presently disclosed subject matter. In some examples, the network 106 is a network designed to receive and transmit cellular communications, though other types of networks may be used.

In instances in which a user (not shown) of the user device wishes to be authenticated to use a particular service, the user may invoke the functionality of the central authentication service 104 by creating a temporal identity vault 108. As used herein, a temporal identity vault 108 is a secured source of information or data used to authenticate the user and generally refers to a data store or other memory location in which associated data items are stored. The temporal identity vault 108 is generated when a vault generation user interface 110 receives an input to generate the temporal identity vault 108.

Once the input is received to generate the temporal identity vault 108, identity information user interface 112 are rendered on the user device 102. The identity information user interface 112 is configured to receive one or more inputs used to identify and authenticate the user. For example, the identity information user interface 112 may be configured to receive a biometric input from the user. A biometric input can include, but is not limited to, a user's fingerprint, voice input, facial features, and the like. The presently disclosed subject matter is not limited to any particular type of biometric input.

The identity information user interface 112 may be configured to receive another input such as a personal identification number, another biometric input, a password, and the like. The presently disclosed subject matter is not limited to any particular type of input for the identity information user interface 112. Further, the presently disclosed subject matter is not limited to the use of two inputs, as one input may be used or more than two inputs may be used, and are considered to be within the scope of the presently disclosed subject matter.

Once the inputs from the identity information user interface 112 are received, the inputs are encrypted and stored as user identity data 114 in the temporal identity vault 108. In some configurations, the temporal identity vault 108 is also stored in the central authentication service 104. Once generated, the temporal identity vault is configured for use. In some examples, a user accesses the central authentication service 104 to invoke a configuration module 116. In some examples, the configuration module 116 modifies or adds data to the temporal identity vault 108 to determine how the temporal identity vault 108 is to be used.

In some examples, the modification of how the temporal identity vault 108 is to be used is at least one of the advances over conventional authentication systems. For example, user identities are typically stored and used in an agnostic way. For example, a computing system may have stored thereon user data such as a password. The password can be used to access a system for various uses at various times. A banking system may allow a user to log into the system at various times. In a different manner, the temporal identity vault 108 is configured using the configuration module 116 to modify and determine the use of the temporal identity vault 108 for one or more uses, locations, or times.

In some examples, to configure the temporal identity vault 108, the temporal identity vault 108 may be associated with a beacon 118. As used herein, a beacon 118 is a location, time, or use that can be identified. For example, the beacon 118 can be a hotel door lock. When a user's device, such as the user device 102, comes within a predetermined distance of the beacon 118, an authentication process may be commenced, whereby a user is authenticated to be able to open the hotel door lock.

In some examples, the beacon 118 may communicate with the central authentication service 104 through the network 106 or the user device 102 may communicate with the central authentication service 104 to commence the authentication process. The presently disclosed subject matter is not limited to any particular method of communication.

When the user device 102 is detected as being within a predetermined location, time, or use of the beacon 118, in some examples, the user device 102 may commence communication with the central authentication service 104 to commence the authentication process. In some examples, the central authentication service 104 invokes a verification module 120. The verification module 120 is configured to receive the user identity data 114 from the temporal identity vault 108.

In some configurations, unless the user device 102 is within a predetermined location, time, or use of the beacon 118, the temporal identity vault 108 is not accessible by the central authentication service 104 verification module 120. To "unlock" the temporal identity vault 108 for use, the user device 102 is within a predetermined location, time, or use of the beacon 118. If the user device 102 is within a predetermined location, time, or use of the beacon 118, the verification module 120 can access and receive the user identity data 114.

Once received, the user identity data 114 is compared with a copy of the temporal identity vault 108 stored by the central authentication service 104. If the user identity data 114 stored by the user device 102 is compared to the user identity data 114 stored by the central authentication service 104 and determined to be authentic, the central authentication service 104 transmits an authentication successful message 122 to the beacon 118. The beacon 118 may thereafter allow the use of a particular service, such as a door lock.

In some examples, the temporal identity vault 108 may have stored therein multiple types of user identification data that can be accessible at various times, locations, or uses. In FIG. 1, in addition to the user identity data 114 described above, the temporal identity vault 108 may also include one or more second user identity data, such as user identity data 124. The user identity data 124 may be configured using the configuration module 116 to only be accessible based on various conditions.

In some examples, the user identity data 124 is only accessible once the user identity data 114 is used to authenticate a user. The access to the user identity data 124 can be controlled using an access configuration stored as a temporal identity vault configuration. For example, the user identity data 114 may be used to authenticate a user to open a hotel door lock. Once used, the user identity data 124 may accessible to further authenticate a user. For example, inside a hotel room may be a safe. In order for the safe to be opened, the user identity data 124 is to be used.

However, the access configuration to the user identity data 124 may include a configuration setting that the user identity data 124 may only be accessible for authentication purposes if the user identity data 114 is used to authenticate the user for entry into the room. In this example, if someone breaks into the hotel room, the safe is not accessible because the user identity data 114 was not used to authenticate entry. In these and other examples, a user's identity can be authenticated using actions the user would normally have to take to provide an increased security protocol. In the example provided above, a user would arguably normally enter the room and be authenticated. The use of the entry authentication step may not place an extra burden or require additional actions to authenticate the safe. In some examples, if the user identity data 124 is received, a second beacon, a second temporal identity vault configuration, and a second object may be associated with the user identity data 124.

As mentioned above, once authenticated, the authentication successful message 122 can be transmitted. In some examples, the use of the authentication successful message 122 can also increase security. For example, the beacon 118 may be associated with a location that does not have secure communications. Entering identification information using facilities in a non-secure location can lead to identity theft, as well as other issues.

The location using the beacon 118 does not receive identifying information. Rather, some examples of the presently disclosed subject matter transmit the encrypted user identity data 114 and/or 124. The location using, or associated with, the beacon 118 can only receive the authentication successful message 122. Therefore, another service, such as the central authentication service 104, receives, decrypts, and authenticates the user identity data 114 and/or 124.

Figure 2:
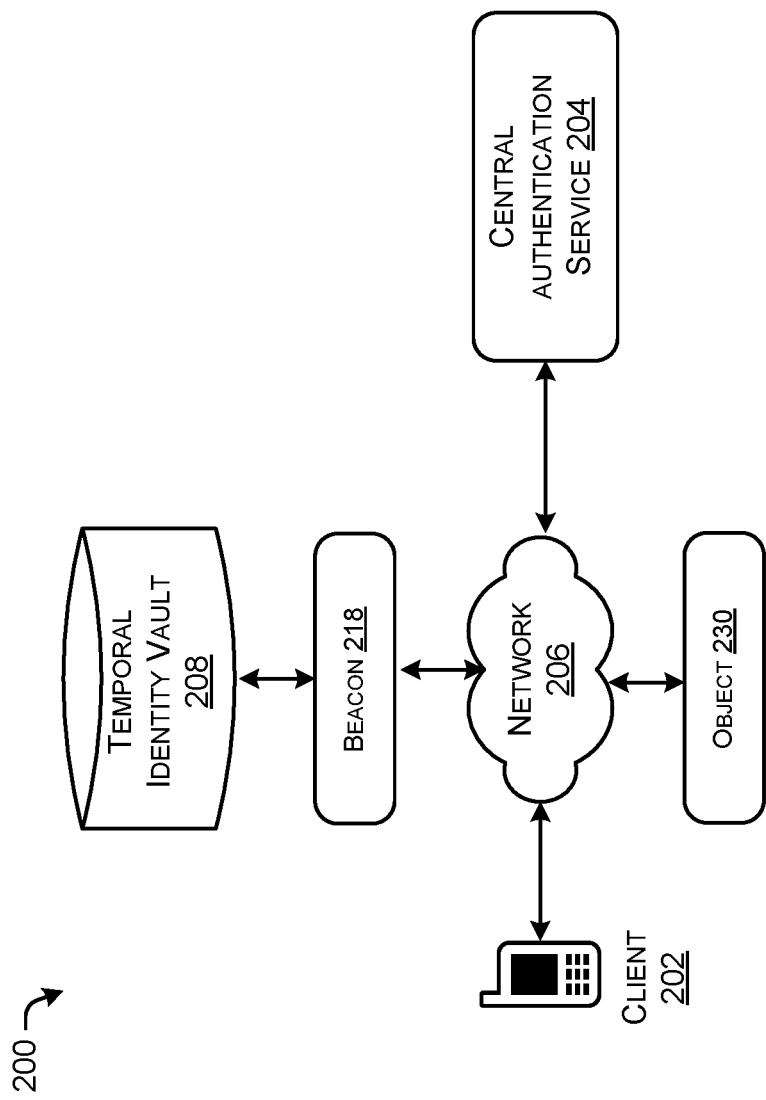
FIG. 2 illustrates an object system associating a beacon with an object.

FIG. 2 illustrates an object system 200 associating a beacon with an object. In the object system 200, a client 202 is used to collect and register identifying information to be stored in a temporal identity vault 208, similar to the manner explained in FIG. 1. During configuration, the beacon 218 is associated with an object 230. In some examples, the object 230 is a location. Some examples include, but are not limited to, hotel locks, bank locks, computing devices, and the like.

In other examples, the object 230 is a time. For example, the object 230 can be associated with an operation that is determined to be approved for commencement at a particular time, whereby other times the object 230 is considered to be invalid. In other examples, the object 230 is associated with a particular operation. For example, the operation 230 can be accessing a room, a bank, and the like. The presently disclosed subject matter is not limited to any particular type associated with the object 230.

During use, the beacon 218 may be placed in a location or active during a period of time, depending on the object 230, that allows the commencement of the authentication process by a central authentication service 204. In an example when a beacon 218 is a device having near field capabilities and the object 230 is a hotel door lock, when the beacon 218 is placed proximate and in a suitable location to the object 230, the beacon 218 may transmit a signal through network 206 to the client 202 to commence the authentication service. The client 202 may transmit information associated with the temporal identity vault 208 to the central authentication service 204. If the information associated with the temporal identity vault 208 is authenticated, the central authentication service 204 may transmit a signal that allows for the object 230 to be operated on (such as opening a lock).

As used herein, "proximate" to a location means a distance in which the beacon 218 is considered to be close to or at the same location as the object 230. For example, if the beacon 218 is a key fob and the object 230 is a lock with near field communications, proximate may mean within several feet whereby the object 230 can detect and communicate with the beacon 218. In a similar manner, "proximate" to a time means a period of time from a pre-determined time that is considered to be close to the time. For example, if the beacon 218 is a key fob and the object 230 is a computing device that can be unlocked for use during a period of time, proximate to the period of time can be minutes or hours prior to, during, and minutes or hours after the period of time. It should be understood that "proximate" may be based on a particular configuration or use, and that the presently disclosed subject matter is not limited to any particular definition or limitation of "proximate."

In some examples, the temporal identity vault 208 may be configured to be for a single use or a specific use. For example, the temporal identity vault 208, when used or after a period of time after use, may be configured to be erased or otherwise made unavailable. For example, the temporal identity vault 208 may be configured with hotel reservations, whereby the temporal identity vault 208 is only valid during the reservation dates and times. Outside of the reservation times, the temporal identity vault 208 may be inaccessible or invalid.

Figure 3:
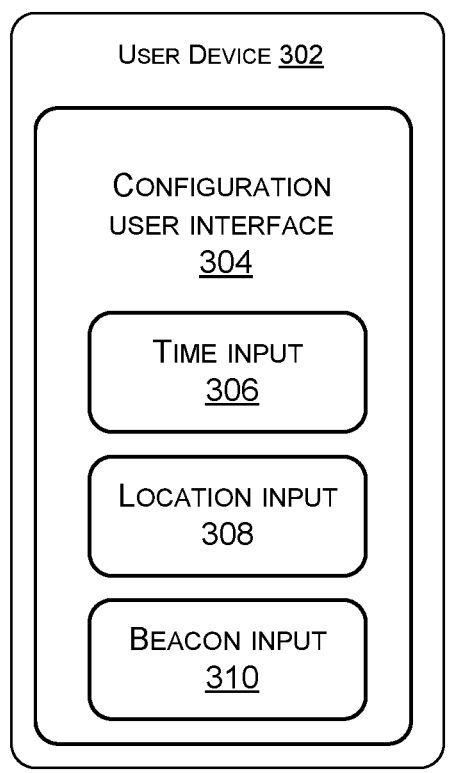
FIG. 3 illustrates a configuration user interface of a user device that may be used in conjunction with a configuration module.

FIG. 3 illustrates a configuration user interface 304 of a user device 302 that may be used in conjunction with a configuration module, such as the configuration module 116 of FIG. 1. As noted above, a temporal identity vault, such as the temporal identity vault 108, or a beacon, such as the beacon 118, of FIG. 1, can be configured to be used with a particular object. It should be understood that that particular configurations illustrated in FIG. 3 are merely examples, as the a temporal identity vault 108 and the beacon 118 can be configured in other ways, which are also considered to be within the scope of the presently disclosed subject matter.

As illustrated in FIG. 3, the configuration user interface 304 includes various inputs for configuring a temporal identity vault and/or a beacon. The configuration user interface 304 includes a time input 306. The time input 306 is configured to receive an input regarding a time associated with a beacon and/or a temporal identity vault. For example, the time input 306 can be used to input a particular time (or date) that the temporal identity vault is valid or active.

The configuration user interface 304 can also include a location input 308. The location input 308 can be configured to receive a location at which a temporal identity vault can be used. For example, the location input 308 can be the location of a hotel or a location of a lock. In some examples, the configuration user interface 304 is configured to receive information from a third-party source. For example, the time input 306 and the location input 308 can be received from a hotel website or communication that specifies the time and location that the user will be spending in the hotel.

The configuration user interface 304 can also include a beacon input 310. In some examples, the beacon input 310 may receive information about the beacon itself. For example, the beacon input 310 can receive information that the phone, a key fob, or other item is to be used as the beacon. The beacon input 310 can also include serial numbers and the like associated with the beacon.

Figure 4:
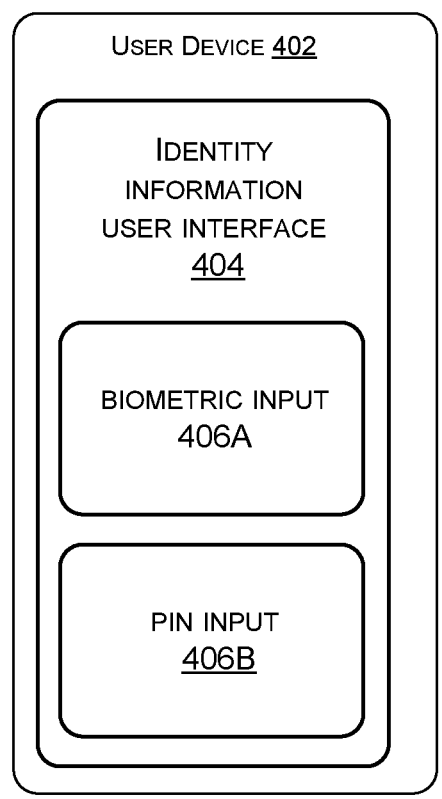
FIG. 4 illustrates an identity information user interface of a user device that may be used to receive identity inputs.

FIG. 4 illustrates an identity information user interface 404 of a user device 402 that may be used to receive identity inputs. For example, the identity information user interface 404 can be configured to receive two types of inputs: a biometric input 406A and a personal identification number (PIN) input 406B. As noted above, the presently disclosed subject matter is not limited to any particular type or number of identity inputs. The biometric input 406A is configured to receive a biometric input that can be used to identify an individual. The biometric input 406A can vary and can include, by way of example and not by way of limitation, facial features, voice features, fingerprints, and the like of the user to be authenticated.

It should be noted that the presently disclosed subject matter is not limited by requiring the user to be authenticated to be the user entering in the biometric input 406A or PIN input 406B (or other identifying information). For example, a parent may have stored a file having fingerprint information of a child. The parent can enter the fingerprint information as the biometric input 406A. In that example, the user to be authenticated can be a child to which a parent has given access to an object.

Figure 5:
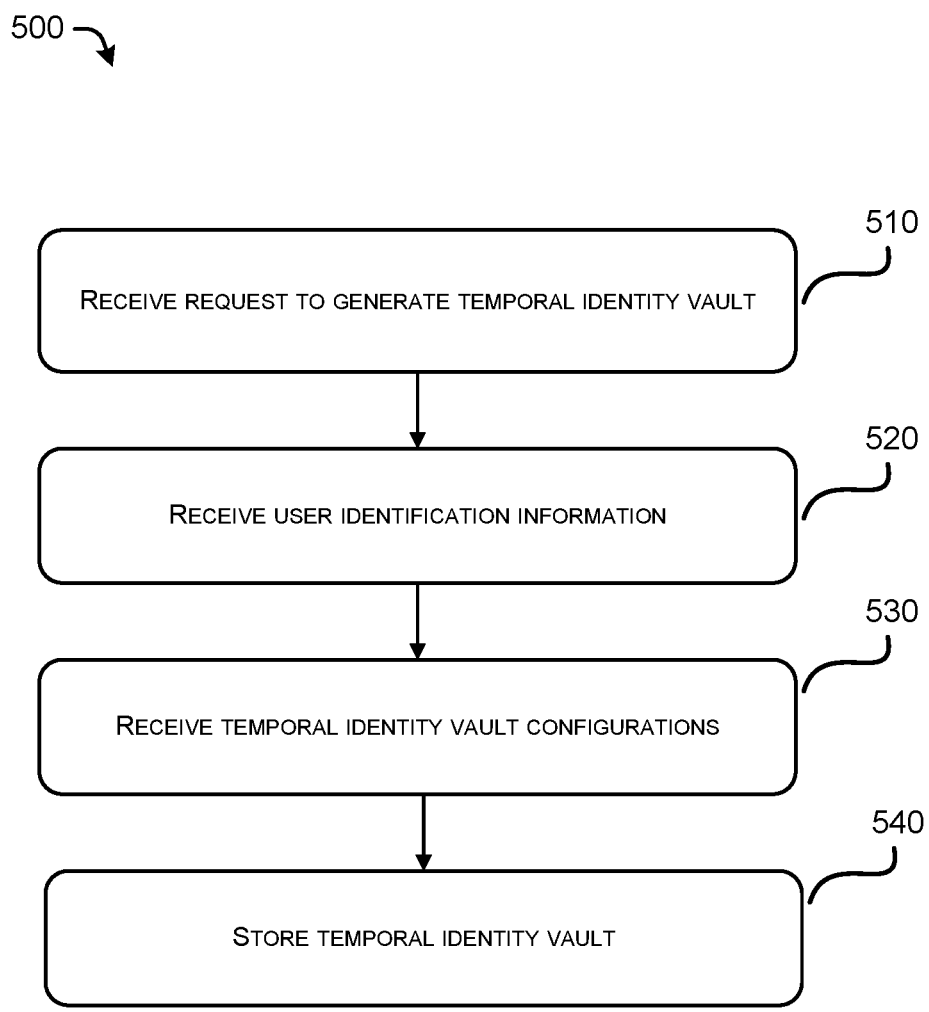
FIG. 5 illustrates an example temporal identity vault generation process.
Figure 6:
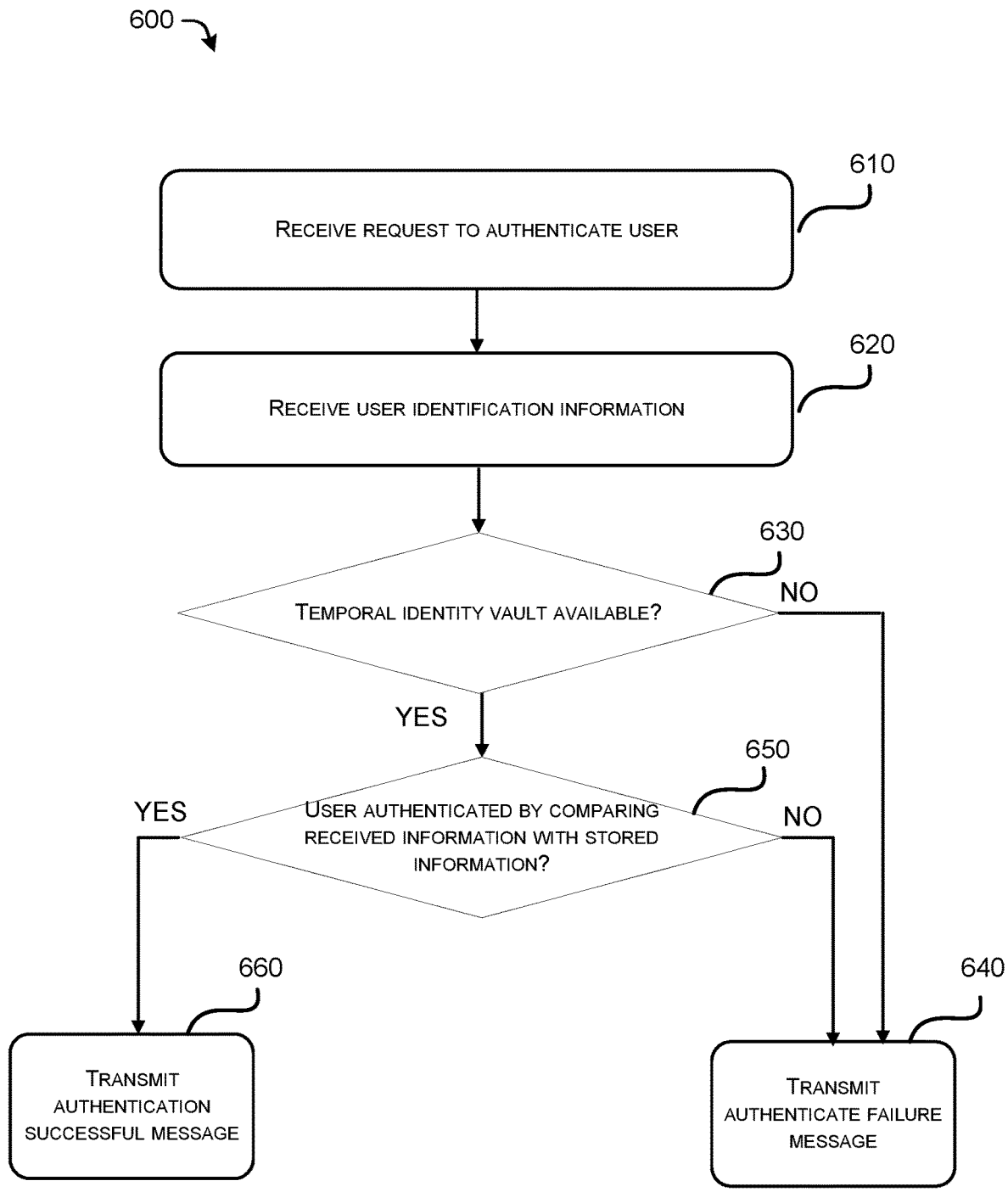
FIG. 6 illustrates an example authentication process.

FIG. 5 illustrates an example temporal identity vault generation process 500 and FIG. 6 illustrates an example authentication process 600. The processes are illustrated as example flow graphs, each operation of which may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Referring to FIG. 5, the temporal identity vault generation process 500 commences at operation 510, where a request to generate a temporal identity vault 108 is received. The request may be received in various manners, such as, but not limited to, an input receiving using the vault generation user interface 110. However, the request to generate a temporal identity vault may be received using other processes or technologies. For example, a user may desire to stay at a hotel. As part of the registration process, the user may be prompted with an option to create a temporal identity vault using the user device 102. If the user accepts, the user device 102 may be configured to begin the temporal identity vault 108 generation process. In those and other similar examples, a third-party application or process may generate the request.

The temporal identity vault generation process 500 proceeds to operation 520, where user identification information is received. The user identification information can be user identity data 114 and 124 of FIG. 1. The identity information user interface 112 can be invoked to receive user identity data 114 and 124. The user identity data 114 and 124 can vary, but in some examples, can be a biometric input 406A and a PIN input 406B.

The temporal identity vault generation process 500 proceeds to operation 530, where temporal identity vault configurations are received. The configuration user interface 304 can be invoked to receive various configurations to be applied to the temporal identity vault 108. For example, and not by way of limitation, the beacon 118 to be used can be identified. In some examples, the beacon 118 can be a key fob, a device capable of connecting to a network, or other devices such as a cellular telephone. The configuration user interface 304 is also configured to receive inputs such as a location of the object 230 to which the beacon 118 is associated, times, dates, and locations of use for the beacon 118 and/or the object 230, and the like.

The temporal identity vault generation process 500 proceeds to operation 540, where the temporal identity vault 108, including, but not limited to, the configurations set forth in operation 530 and the identification information of operation 520, are stored. The temporal identity vault 108 can be encrypted using various encryption algorithms and stored locally on the user device 102. A copy of the temporal identity vault 108 can also be stored on the central authentication service 104. Storing a copy of the temporal identity vault 108 at the central authentication service 104 allows for authentication operations, as described above and by way of example in FIG. 6.

Referring to FIG. 6, a user authentication process 600 using the temporal identity vault 108 is described. The process 600 commences at operation 610, where a request to authenticate a user is received. In some examples, the request to authenticate a user can be received by a user desiring to use an object associated with the temporal identity vault 108. In other examples, the request to authenticate a user can be received from an entity or system that a user is requesting permission to use. The presently disclosed subject matter is not limited to any particular source of the request to authenticate the user.

The process 600 continues to operation 620, where user identification information is received. In some examples, the user identification information is the user identity data 114 and/or 124 stored in the temporal identity vault 108. In some examples, the user identity data 114 and/or 124 are encrypted when stored in the temporal identity vault 108 or may be encrypted prior to transmission to the central authentication service 104. In some examples, the user identity data 114 and/or 124 is not encrypted.

The process 600 continues to operation 630, where a determination is made as to whether or not the temporal identity vault 108 is available. In some examples, a temporal identity vault 108 is not available if the configuration of the temporal identity vault 108 does not allow for its use. In one example, the beacon 118 may not be in the right place or at a particular location at a particular time (depending on the configuration settings of the temporal identity vault 108). Therefore, if the process 600 has started without the beacon 118, the process 600 can be stopped.

In another example, the temporal identity vault 108 may be configured to be available only during certain times, like a day and time to check into and out of a hotel. If the temporal identity vault 108 is used outside of those times, the temporal identity vault 108 may not be available for use. If at operation 630 the determination is that the temporal identity vault 108 is not available, the process 600 continues to operation 640 where an authentication failure message is transmitted. The process 600 may thereafter end or recommence.

If at operation 630 the determination is that the temporal identity vault 108 is available, the process 600 continues to operation 650, where the user is authenticated by comparing received information with stored information. In some examples, the temporal identity vault 108 user identity data 114 and/or 124 stored at the user device 102 is compared to the copy of the temporal identity vault 108 user identity data 114 and/or 124 stored at the central authentication service 104. It should be understood that the presently disclosed subject matter is not limited to any particular location of storage of the temporal identity vault 108. For example, the temporal identity vault 108 described above as being stored at the user device 102 can be stored in other locations, such as a third-party service, another device, and the like.

If at operation 650 the determination is that the user is not authenticated, the process 600 continues to operation 640 where an authentication failure message is transmitted. The process 600 may thereafter end or recommence.

If the user is authenticated at operation 650, the process continues to operation 660, where an authentication successful message is transmitted. In some examples, authenticating the user in a more secure system, like the central authentication service 104 rather than a potentially less secure system such as a hotel, can increase security of user identification information. In some examples, systems that the user wishes to use, such as a hotel's room, may not be secure systems. Because in some examples the hotel does not receive the user identification information, the user identification can be more readily secured against identity theft and the like.

Figure 7:
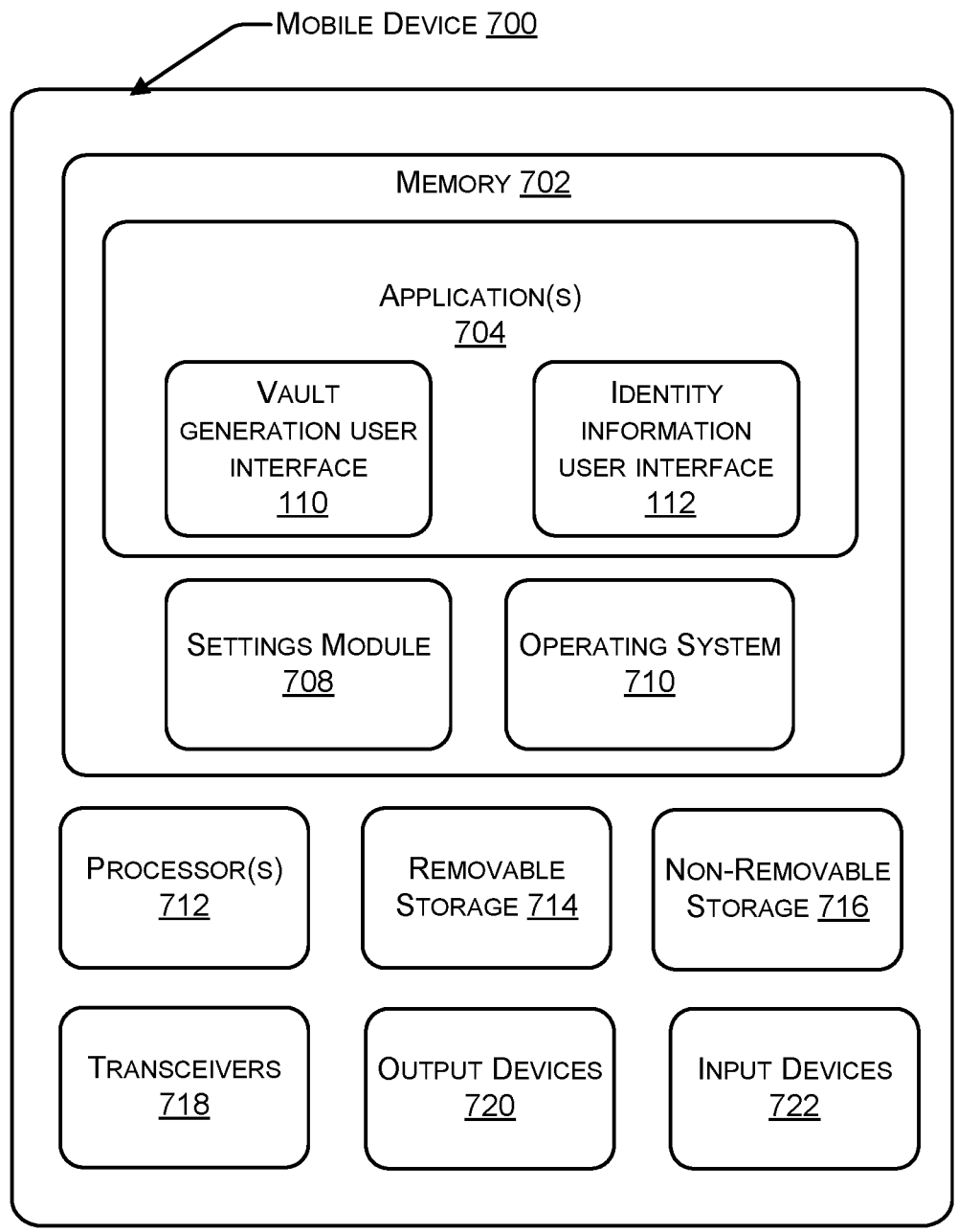
FIG. 7 illustrates a component level view of a mobile device configured to function within a wireless communication network.

FIG. 7 illustrates a component level view of a mobile device 700 configured to function within a wireless communication network that may be used as the user device 102. As illustrated, the mobile device 700 comprises a system memory 702 for storing application(s) 704. The applications 704 can include the vault generation user interface 110 and the identity information user interface 112. The system memory 702 can also be used to store the temporal identity vault 108. Also, the mobile device 700 includes processor(s) 712, a removable storage 714, a non-removable storage 716, transceivers 718, output device(s) 720, and input device(s) 722. In various implementations, system memory 702 is volatile (such as RAM), non-volatile (such as ROM, flash memory, etc.) or some combination of the two. In some implementations, the processor(s) 712 is a central processing unit (CPU), a graphics processing unit (GPU), or both CPU and GPU, or any other sort of processing unit.

The mobile device 700 may also include additional data storage devices (removable and/or non-removable) such as, for example, magnetic disks, optical disks, or tape. Such additional data storage may include removable storage 714 and non-removable storage 716.

Non-transitory computer-readable media may include volatile and nonvolatile, removable and non-removable tangible, physical media implemented in technology for storage of information, such as computer readable instructions, data structures, program modules, or other data. System memory 702, removable storage 714 and non-removable storage 716 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the user device 700. Any such non-transitory computer-readable media may be part of the user device 700.

The non-transitory computer-readable media can be configured to store computer-executable instructions that, when executed by the processor 806, cause the processor 806 to perform the instructions.

In some implementations, the transceivers 718 include any sort of transceivers known in the art. For example, the transceivers 718 may include a radio transceiver that performs the function of transmitting and receiving radio frequency communications via an antenna. Also or instead, the transceivers 718 may include wireless modem(s) to may facilitate wireless connectivity with other computing devices. Further, the transceivers 718 may include wired communication components, such as an Ethernet port, for communicating with other networked devices.

In some implementations, the output devices 720 include any sort of output devices known in the art, such as a display (e.g., a liquid crystal display), speakers, a vibrating mechanism, or a tactile feedback mechanism. Output devices 720 also include ports for one or more peripheral devices, such as headphones, peripheral speakers, or a peripheral display.

In various implementations, input devices 722 include any sort of input devices known in the art. For example, input devices 722 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Figure 8:
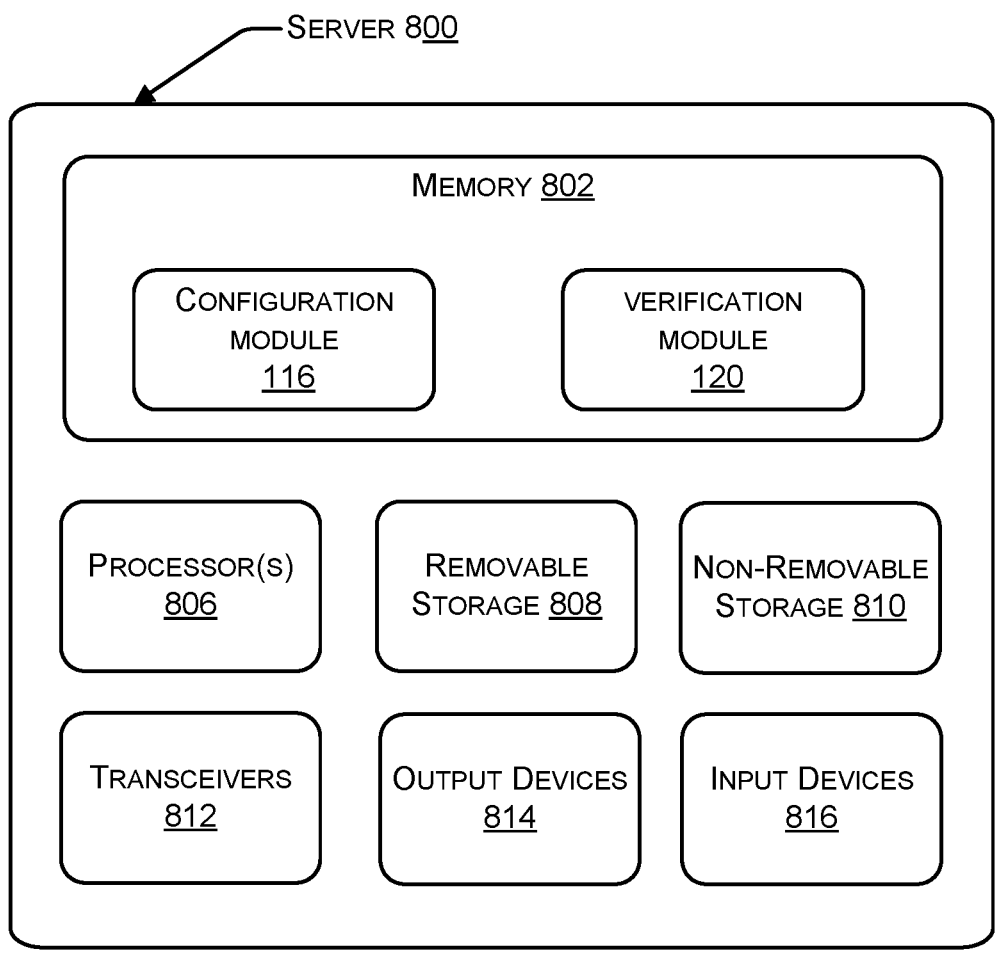
FIG. 8 illustrates a component level view of a server configured for use within a wireless communication network in order to provide various services within the wireless communication network, such as the central authentication service.

FIG. 8 illustrates a component level view of a server 800 configured for use within a wireless communication network in order to provide various services within the wireless communication network, such as the central authentication service 104. The server 800 may be located in a radio network controller or gateway. Additionally, the server 800 may be a separate entity located separately from the RNC or gateway. As illustrated, the server 800 comprises a system memory 802 storing the configuration module 116 and the verification module 120. The system memory 802 may also store additional applications and programs. Also, the server 800 includes processor(s) 806, a removable storage 808, a non-removable storage 810, transceivers 812, output device(s) 814, and input device(s) 816.

In various implementations, system memory 802 is volatile (such as RAM), non-volatile (such as ROM, flash memory, etc.) or some combination of the two. In some implementations, the processor(s) 806 is a central processing unit (CPU), a graphics processing unit (GPU), or both CPU and GPU, or any other sort of processing unit.

The server 800 may also include additional data storage devices (removable and/or non-removable) such as, for example, magnetic disks, optical disks, or tape. Such additional storage is illustrated in FIG. 8 by removable storage 808 and non-removable storage 810.

Non-transitory computer-readable media may include volatile and nonvolatile, removable and non-removable tangible, physical media implemented in technology for storage of information, such as computer readable instructions, data structures, program modules, or other data. System memory 802, removable storage 808 and non-removable storage 810 are all examples of non-transitory computer-readable media. Non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the server 800. Any such non-transitory computer-readable media may be part of the server 800.

In some implementations, the transceivers 812 include any sort of transceivers known in the art. For example, the transceivers 812 may include wired communication components, such as an Ethernet port, for communicating with other networked devices. Also or instead, the transceivers 812 may include wireless modem(s) to may facilitate wireless connectivity with other computing devices. Further, the transceivers 812 may include a radio transceiver that performs the function of transmitting and receiving radio frequency communications via an antenna.

In some implementations, the output devices 814 include any sort of output devices known in the art, such as a display (e.g., a liquid crystal display), speakers, a vibrating mechanism, or a tactile feedback mechanism. Output devices 814 also include ports for one or more peripheral devices, such as headphones, peripheral speakers, or a peripheral display.

In various implementations, input devices 816 include any sort of input devices known in the art. For example, input devices 816 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, the method comprising:
   receiving, at a user device of a user, an input to generate a temporal identity vault;
   receiving, at the user device of the user, user identity data of the user comprising user biometric data of the user;
   receiving, at the user device of the user and from the user, a temporal identity vault configuration;
   applying, by the user device of the user, the temporal identity vault configuration to the temporal identity vault comprising the user identity data to generate a configured temporal identity vault that identifies the user;
   associating a beacon with an object to control access to the user identity data of the user using the temporal identity vault configuration;
   storing the configured temporal identity vault comprising the user identity data on the user device of the user;
   receiving a second temporal identity vault configuration associated with a second beacon to control access to one of the user identity data or another user identity data;
   applying the second temporal identity vault configuration to the configured temporal identity vault including a configuration that access to the one of the user identity data or the other user identity data in association with the second beacon is allowed if the user identity data was used to authenticate the user in association with first beacon; and
   storing the configured temporal identity vault to which the second temporal identity vault configuration was applied.

2. The method of claim 1, further comprising transmitting a copy of the configured temporal identity vault to a central authentication service.

3. The method of claim 1, wherein storing the configured temporal identity vault further comprises encrypting the user identity data.

4. The method of claim 1, wherein the beacon comprises a key fob or cellular device.

5. The method of claim 1, wherein the object comprises a location.

6. The method of claim 5, wherein the object comprises a lock or a computing device.

7. The method of claim 1, wherein the object comprises a time.

8. The method of claim 1, further comprising:
   receiving the other user identity data; and
   associating a second beacon with a second object to control access to the other user identity data; and
   wherein the stored configured temporal identity vault to which the second temporal identity vault configuration was applied comprises the other user identity data on the user device.

9. The method of claim 8, wherein the second temporal identity vault configuration comprises an access configuration.

10. The method of claim 9, wherein the access configuration comprises the configuration that the other user identity data is accessible if the user identity data was used to authenticate the user in association with first beacon.

11. A method of authenticating a user, comprising:
    receiving, at a central authentication service and from a user device that is separate from the central authentication service, a first request to authenticate a user of the user device;
    receiving user identity information of the user associated with a temporal identity vault that identifies the user, the temporal identity vault that identifies the user being generated, based on a temporal identity vault configuration, at the user device of the user that is separate from the central authentication service;
    determining if the temporal identity vault is available for use using the temporal identity vault configuration;
    if the temporal identity vault is available for use, comparing the received user identity information of the user associated with the temporal identity vault to user identification identity information of the user stored at the central authentication service;
    authenticating the user if the received user identity information is the same as the user identity information stored at the central authentication service;
    transmitting an authentication successful message;
    receiving, at the central authentication service, a second request to authenticate the user of the user device;
    determining the user was successfully authenticated in response to the first request to authenticate the user of the user device; and
    authenticating the user in response to the second request to authenticated based at least in part on the determining the user was successfully authenticated in response to the first request to authenticate.

12. The method of claim 11, wherein determining if the temporal identity vault is available for use comprises determining if a beacon associated with the user identification received at the central authentication service is proximate to an object.

13. The method of claim 12, wherein the beacon comprises a key fob or cellular device.

14. The method of claim 12, wherein the object comprises a location.

15. The method of claim 12, wherein the object comprises a lock or a computing device.

16. The method of claim 12, wherein the object comprises a time.

17. An apparatus comprising:
    a non-transitory storage medium; and
    instructions stored in the non-transitory storage medium, the instructions being executable by the apparatus to:
      receive, at a central authentication service and from a user device that is separate from the central authentication service, a first request to authenticate a user of the user device;
      receive user identity information of the user associated with a temporal identity vault that identifies the user, the temporal identity vault that identifies the user being generated, based on a temporal identity vault configuration, at the user device of the user that is separate from the central authentication service;
      determine if the temporal identity vault is available for use;
      if the temporal identity vault is available for use, compare the received user identity information of the user associated with the temporal identity vault to user identification identity information of the user stored at the central authentication service;
      authenticate the user if the received user identity information is the same as the user identity information stored at the central authentication service;

transmit an authentication successful message;
receive, at the central authentication service, a second request to authenticate the user of the user device;
determine the user was successfully authenticated in response to the first request to authenticate the user of the user device; and
authenticate the user in response to the second request to authenticated based at least in part on the determining the user was successfully authenticated in response to the first request to authenticate.

18. The apparatus of claim 17, wherein the computer-executable instructions to determine if the temporal identity vault is available for use comprises computer-executable instructions to determine if a beacon associated with the user identification received at the central authentication service is proximate to an object.

19. The apparatus of claim 18, wherein the beacon comprises a key fob or a cellular device.

20. The apparatus of claim 18, wherein the object comprises a location, a lock, or a computing device.

* * * * *